R. M. CRAIG.
ADVERTISING SIGN.
APPLICATION FILED MAY 7, 1917.
1,374,282.  Patented Apr. 12, 1921.
3 SHEETS—SHEET 1.
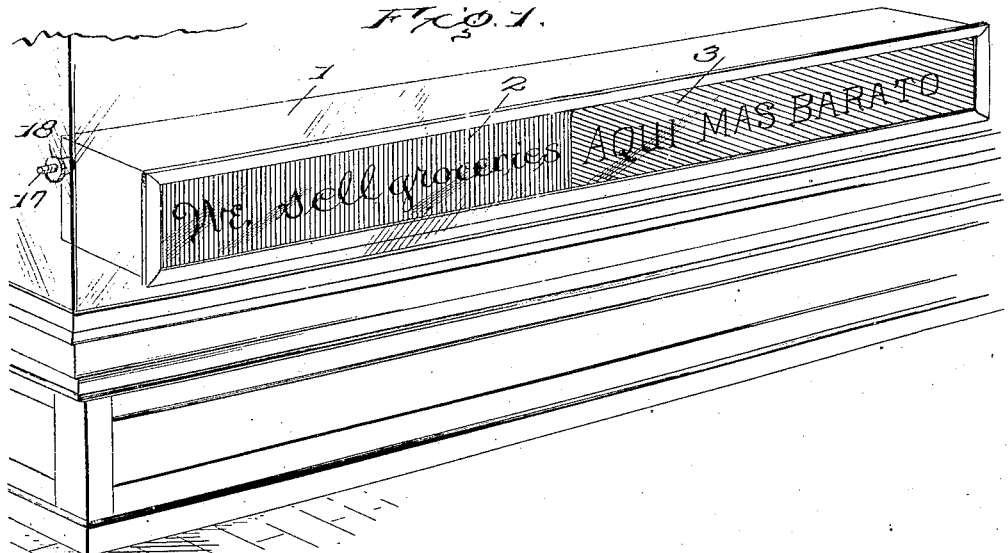
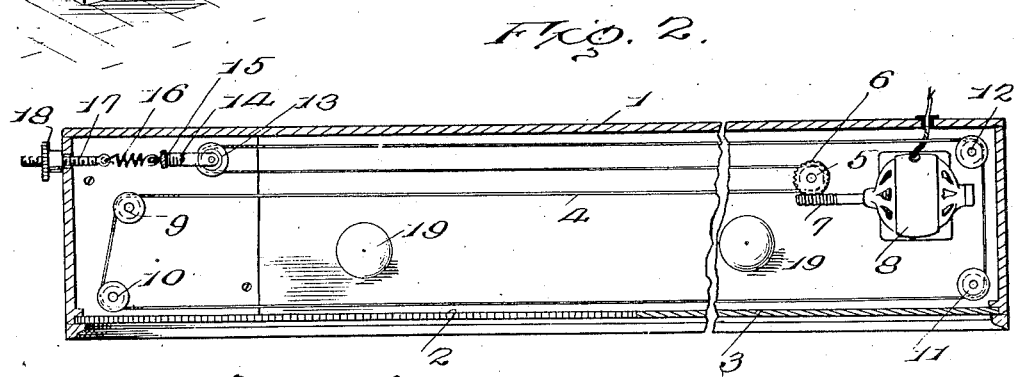
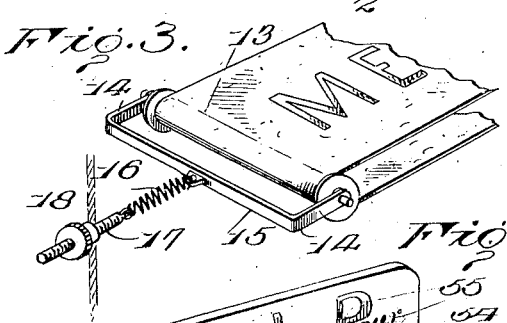
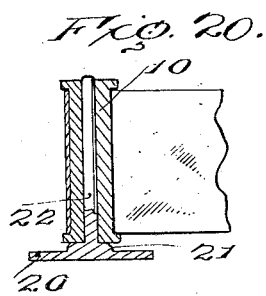
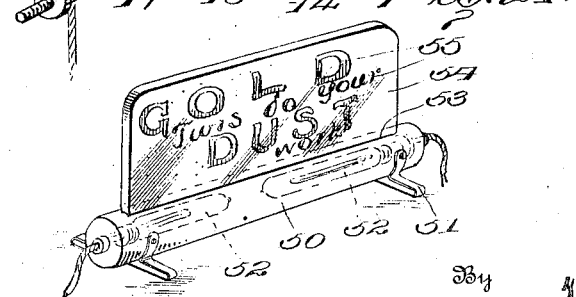
Inventor
R. M. Craig
By
Attorneys

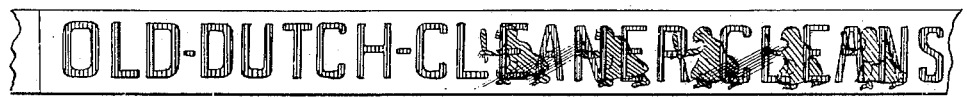
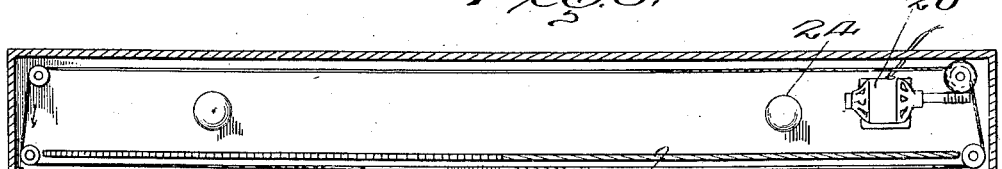
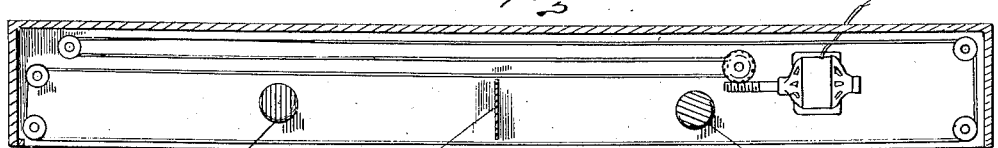
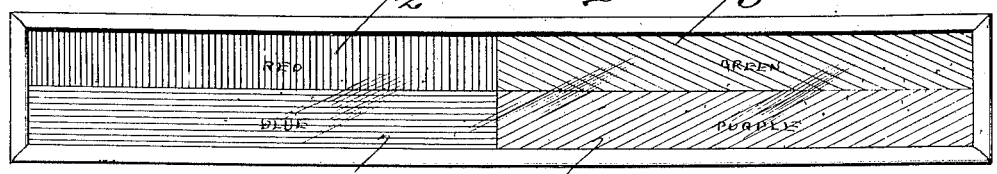

R. M. CRAIG.
ADVERTISING SIGN.
APPLICATION FILED MAY 7, 1917.
1,374,282.
Patented Apr. 12, 1921.
3 SHEETS—SHEET 3.
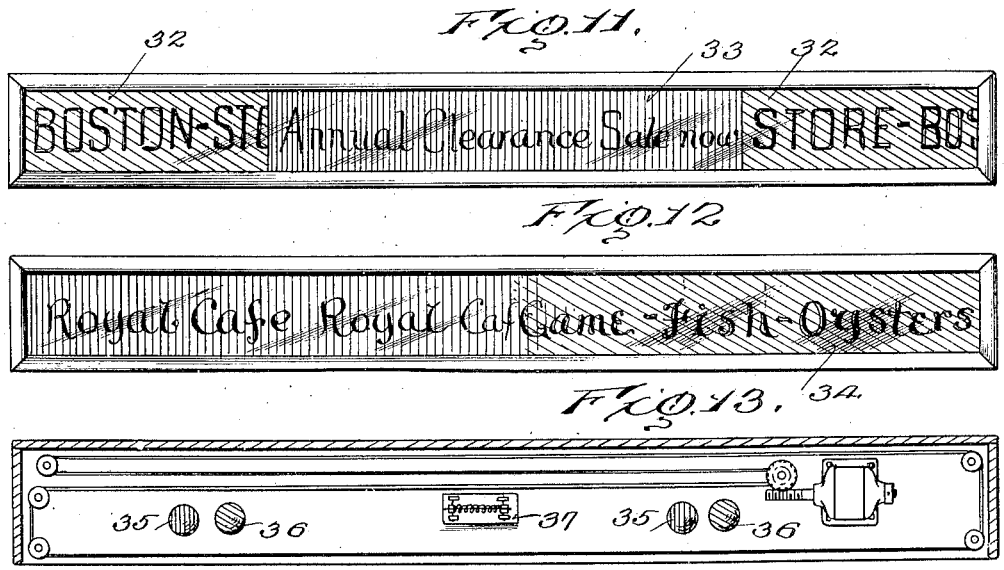
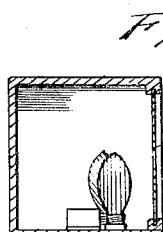
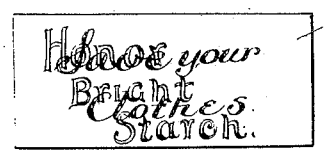
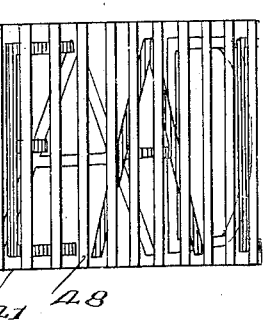
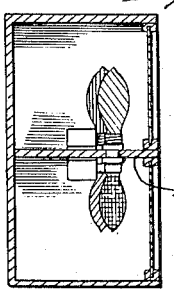
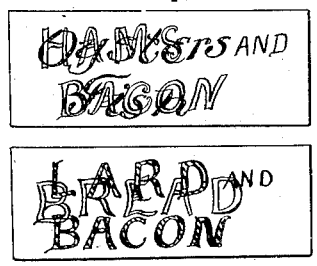
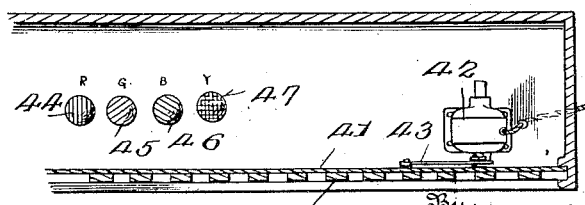
Inventor
R. M. Craig

UNITED STATES PATENT OFFICE.

RICHARD MORGAN CRAIG, OF SAN ANTONIO, TEXAS.

ADVERTISING-SIGN.

1,374,282.   Specification of Letters Patent.   Patented Apr. 12, 1921.

Application filed May 7, 1917. Serial No. 166,995.

*To all whom it may concern:*

Be it known that I, RICHARD M. CRAIG, a citizen of the United States, residing at San Antonio, in the county of Bexar and State of Texas, have invented certain new and useful Improvements in Advertising-Signs, of which the following is a specification.

This invention relates to advertising signs and has as its primary object to provide means whereby advertising matter may be displayed in a manner which will command attention to a greater degree than display devices heretofore employed. The device embodying the present invention, in its operation, involves the elements of motion, color, illumination, and mystery.

It is one aim of the invention to provide for the display upon a surface of a given area of advertising matter which by any other method of display would occupy at least twice the said area.

More specifically speaking, the invention contemplates the depiction by painting, printing, or any other suitable method, of at least two advertisements in overlapped relation upon a display surface of a given area, the advertisements being of different colors and then displaying said surface under conditions where the colors will be absorbed independently. In one form of the invention, for example, an advertising band has printed thereon in overlapped or superimposed relation two advertisements in different colors as, for example, red and green, and this band is caused to travel past two transparent panes, one red and the other green, either with or without illumination rearwardly of the band, and as the band so travels the advertising matter which is in red will be absorbed in passing the red pane and therefore only the advertising matter in green will be visible. On the other hand, the advertising matter which is in red will alone be visible in passing the green pane. Thus a merchant, for example, may employ a band bearing in different colors and in completely superimposed relation two advertisements in different languages and thus advertise his goods with the employment of a minimum advertising space and yet in such manner that the advertisements may be read by persons speaking different languages.

In this particular instance as the band is caused to travel beside the two panes the colors will be absorbed by the respective panes and both advertisements will be simultaneously displayed but without any confusion whatsoever, the advertising matter in red being wholly invisible through the red pane and the advertising matter in green being wholly invisible through the green pane.

Likewise the principles of the invention may be embodied in the displaying of stationary advertising areas or surfaces by successively displaying such surface in the presence of a color medium capable of absorbing first one and then another of the colors in which the advertising matter is depicted. Whether the advertising surface to be displayed is stationary or movable, the principle of the invention remains the same, namely, the display of independent advertising matters by color absorption, the said advertising matters being, however, actually overlapped or superimposed.

Another aim of the invention is to so mount the advertising traveling band that a band of maximum length may be employed and mounted within a casing of minimum size.

In the accompanying drawings:

Figure 1 is a perspective view illustrating the use of the sign embodying the present invention;

Fig. 2 is a horizontal sectional view through the sign shown in Fig. 1 of the drawings;

Fig. 3 is a perspective view of the tensioning device for use in connection with the endless sign band;

Figs. 4, 5, 6 and 7 are views illustrating portions of different types of sign bands which may be employed in the arrangement shown in Fig. 2 of the drawings;

Fig. 8 is a horizontal sectional view through a sign of slightly different structure;

Fig. 9 is a view similar to Fig. 8 illustrating a still further modification;

Fig. 10 is a view in front elevation of still another type of sign;

Figs. 11 and 12 are views in front elevations of signs embodying a modified arrangement of the invention;

Fig. 13 is a horizontal sectional view illustrating a further modification of the invention;

Fig. 14 is a vertical front to rear sectional view illustrating one form of fixed sign;

Fig. 15 is a similar view illustrating a modified form of fixed sign;

Fig. 16 is a front elevation of the sign display surface to be employed in connection with the device shown in Fig. 14;

Fig. 17 is a view similar to Fig. 16 illustrating the sign display surfaces to be employed in connection with the device shown in Fig. 15;

Fig. 18 is a horizontal sectional view illustrating a further modification of the invention;

Fig. 19 is a diagrammatic view illustrating the principle upon which the structure shown in Fig. 18 is based;

Fig. 20 is a detail vertical sectional view illustrating the manner of mounting one of the rollers about which the advertising band is passed;

Fig. 21 is a perspective view illustrating a further modification of the invention.

The mechanism employed in carrying out the invention is preferably mounted in a rectangular casing which, as it may be of any suitable construction, need not be specifically described, the said casing being indicated in general by the numeral 1, and being provided in its front, in that form of the invention shown in Figs. 1 and 2 of the drawings, with two transparent panes, one indicated by the numeral 2 and the other by the numeral 3, these panes being of glass, celluloid, isinglass, or any other transparent material and being respectively red and green in color or of any other suitable colors. An advertising band of transparent or translucent material is mounted within the casing for travel and this band, which is indicated in general by the numeral 4, passes about a roller 5 having at one end a worm gear 6 meshing with a worm shaft 7 which may be an extension of the shaft of an electric or other suitable motor 8 or a shaft driven by said motor. The band is endless and passes also about rollers 9 and 10 at one end of the casing and other rollers 11 and 12 at the other end of the casing. The band is also passed about a roller 13 which is provided with trunnions mounted in the spaced bearings 14 of a frame 15 to which is connected one end of a spring 16. The other end of this spring is connected to a threaded rod 17 which extends through one end wall of the casing, and an adjusting nut 18 is threaded on to the said rod and bears against the outer face of the said end wall of the casing. The nut 18 may, of course, be adjusted so as to tension the spring 16 and thereby place the desired tension upon the band 4. By employing the roller 13, not only is the band tensioned to the proper degree to cause it to maintain a flat condition, but also it is possible to house, within a casing of relatively small dimensions, a relatively long band and, therefore, there is economy in space and yet a maximum advertising area is acquired. The stretch of the band passing between the rollers 10 and 11 passes immediately in rear of the panes 2 and 3, as clearly shown in Fig. 2 of the drawings, and the motor is so geared with the roller 5 that the band will be caused to travel in a direction from right to left so that as the band passes the panes 2 and 3 the letters of the words comprising the advertising matter will appear in the order in which they are arranged in spelling the words. By reference to Fig. 1 it will be observed that in the position of the band illustrated, an advertisement or notice in English appears through the pane 2 and a similar advertisement or notice in Spanish appears through the pane 3. A portion of the band shown in Fig. 1 is illustrated removed from the casing in Fig. 5, and by reference to this figure it will be observed that the Spanish and English words completely overlap or are superimposed and are intermingled, the English characters being depicted in green and the Spanish characters in red. In preparing this band and also the other similar bands illustrated in the drawings, either the English or Spanish advertising matter is first printed in its distinctive color upon the band or is painted thereon or depicted in any other suitable manner and then by a like method the Spanish advertising matter is applied to the band directly over the English matter. It will now be understood that as the band is caused to travel past the panes 2 and 3, the pane 2 will absorb all of the advertising matter which is printed in red, thereby exposing to view only the matter which is printed in green and in a like manner the pane 3 will absorb all of the matter printed in green and display only the matter printed in red. Of course, it is not absolutely essential that the different advertising matters be arranged in overlapped or superimposed relation but this is obviously preferable when it is considered that in such an arrangement advertising matter may be displayed which by any other method of display would occupy a band having an area twice that of the band 4. While in the type of band shown in Fig. 5 of the drawings the two advertising matters are printed in two different languages it will be understood that many other arrangements may be employed. For example, as shown in Fig. 4 of the drawings the name of an article might be printed in red upon the band and some figure or symbol identifying said article might be printed in green so that the words would appear through the pane 3 and the figures or symbols would appear through the pane 2, the letters comprising the words disappearing as they reach the inner end of the pane 3 and figures or symbols appearing as they reach the inner end of the pane 2. Other examples of sign bands are shown in Figs. 6 and 7, the band shown in Fig. 6 having two advertisements thereon in different type but both in the English language and the letters comprising the advertising matter in Fig. 7 being each printed in two colors or, more specifically, the letter itself being printed in one color and a shadow representation thereof being printed in another color.

As heretofore stated the band 4 is transparent or translucent and while the band is preferably illuminated by white lights 19 located within the casing behind the stretch of the band located between the rollers 10 and 11, it will be understood in daylight the lights 19 might be dispensed with, the advertising matter being viewed through the transparent panes 2 and 3. It is preferable that the several rollers about which the band passes be mounted in the manner shown in Fig. 20 of the drawings in which figure the numeral 20 indicates an attaching base having a more or less rounded boss 21 upon which the lower end of the roller may rest and rotate without undue friction. The roller is disposed upon a spindle 22 and it will be observed that the said spindle extends upwardly centrally from the boss 21 and is unsupported at its upper end so that when it is desired to remove a sign band and replace the same the top of the casing may be removed and the several rollers then slipped upwardly from their spindles. In that form of the invention shown in Fig. 8 of the drawings the medium which bears the advertising matter is stationary and may be in the nature of a plate 23 of glass or any other transparent or translucent material. The advertising matter is, of course, printed upon this plate and the plate is illuminated by lights 24 arranged within the casing. The numeral 25 indicates an endless band of transparent material, portions of which are of one color and other portions of another color. For example, the advertising matter upon the plate 23 may be printed or otherwise depicted in red and green, in which event portions of the length of the band 25 would be red and other portions would be green. The band is caused to travel by a motor 26 and, of course, as the differently colored portions of the length of the band pass before the plate 23 the red characters will be displayed through the green portions of the band and the green characters will be displayed through the red portions of the band.

The form of the invention shown in Fig. 9 of the drawings is somewhat similar to the form first described inasmuch as an endless traveling sign band is employed. However, in this case the casing is divided midway between its ends by a partition 27 into two compartments, in one of which is placed a green light globe 28 and in the other a red globe 29, these light globes, of course, taking the place respectively of the panes 3 and 2.

By reference to Fig. 10 of the drawings it will be observed that the device is not limited to the use of two colors but that if desired four or more colors may be employed. For example, the front of the casing shown in this figure embodies not only the red and green panes 2 and 3 but also panes 30 and 31 which are respectively positioned below the panes 2 and 3, the pane 30 being blue and the pane 31 being purple. In this instance, of course, the upper portion of the sign band would bear advertising matters printed in red and green and the lower portion of the band would bear advertising matters printed in blue and purple. If desired the casing may be provided with three panes instead of two, as shown in Fig. 11 of the drawings, two of these panes being indicated by the numeral 32, being, for example, green in color, and the pane which is arranged between them, and which is indicated by the numeral 33, being red. With this arrangement of panes and employing an endless band, the advertising matter upon the band which is printed in red will disappear as it passes the right hand edge of the pane 33 and will reappear as it passes the left hand edge of the said pane. The advertising matter which is printed in green will, of course, appear as it passes the pane 33 but will not be visible when passing the panes 32.

In Fig. 12 of the drawings there is illustrated still another arrangement, a single pane being employed and indicated by the numeral 34 and at one end being red and at the other end green but with no line of demarcation at the middle of the pane, the colors, on the other hand, merging into each other. When such a pane is employed with the endless band, the advertising matter in red will be visible at one end of the pane and that in green will be visible at the other end of the pane and both the red and green advertising matter will be visible at the middle of the pane.

In that form of the invention shown in Fig. 13 of the drawings, the endless band bearing the red and green advertising matter is caused to pass in front of red electric light bulbs 35 and green bulbs 36 and by means of an electric flasher, indicated by the numeral 37, the bulbs 35 and 36 are successively and intermittently lighted so that when the bulbs 35 are lighted the advertising matter in green alone will be visible and when the flasher acts to extinguish these bulbs and light the bulbs 36, said advertising matter will immediately disappear and the advertising matter in red will appear.

The same principle is involved in the modified form of the invention shown in Figs. 14 and 15 except that in the instance of the form shown in Fig. 14 the display medium is in the nature of a transparent pane 38 having advertising matter printed thereon in red and green, the pane being stationary. In the form of the invention shown in Figs. 15 and 17, two panes are employed, the upper one, for example, bearing advertising matter in red and green and the lower one bearing advertising matter in yellow and blue, the interior of the casing being divided by a partition 39 and red and green bulbs being located in the upper compartment thus formed and yellow and blue bulbs being located within the lower compartment. The upper pane will, therefore, bear advertising matter in red and green and the lower pane will bear advertising matter in yellow and blue.

In the modified form of the invention shown in Fig. 18 of the drawings, a sign member in the nature of a transparent or translucent sheet of material, such, for example, as glass, is prepared in the manner shown diagrammatically in Fig. 19 of the drawings. In preparing the said member a stencil is employed comprising a number of strips 40 relatively spaced a distance equal to their width and this stencil is disposed flat upon the blank sheet comprising the said member. Two signs are then painted or printed over said stencil, in overlapped relation, a sign in red being, for example, first painted and then a sign in green. After the signs have dried the stencil is shifted a distance equal to the width of one of the strips and then two other signs are painted or printed in the same manner, one, for example, in blue and the other in yellow. The sign member thus prepared is mounted in the front of the casing of the device in any suitable manner, the same being indicated by the numeral 41. Either in front or in back of this member there is then mounted for shifting movement a counterpart of the stencil above referred to and in order that the barred screen thus provided may be shifted at the proper time, any suitable type of motor 42 is arranged within the casing and suitably connected, as at 43, with the said screen. Electric light bulbs 44, 45, 46 and 47 are located within the casing behind the display member 41 and these bulbs are respectively, for example, red, green, blue and yellow in color. In the operation of this form of the invention the motor first acts to shift the screen, which is indicated by the numeral 48, so as to cover the portions of the display member 41 which bear the blue and yellow signs, thereby exposing the portions of the display member bearing the red and green signs. The red light, for example, is then lighted by any suitable flasher as heretofore described and immediately upon extinguishment of this light the green light is lighted. The motor is so timed that it will then operate to shift the screen to cover the red and green signs and expose the blue and yellow signs whereupon the blue and yellow globes are successively lighted. Thus it will be seen that in this form of the invention four signs may be arranged in substantially overlapped relation and independently displayed.

In that form of the invention shown in Fig. 21 of the drawings a metallic closed cylinder 50 is suitably mounted as, for example, by brackets 51 and within this cylinder are arranged electric light globes which are of different colors. The cylinder is formed in its upper or outer side with a longitudinally extending slot 53 into which is fitted the lower edge of a single piece or two pieces of plate glass 54 bearing two signs, as indicated at 55, in different colors. In the operation of this sign the electric light globes 52 are alternately lighted so as to illuminate the sign plates 54 thereby successively displaying the signs borne thereby.

Having thus described the invention, what is claimed as new is:

1. In a device of the class described, transparent panes of different colors, a sign band movable past the panes and bearing different advertising matter in different colors corresponding to the colors of said panes, and means for imparting motion to said band.

2. In a device of the class described, a traveling sign band having signs thereon in different colors, means for imparting motion to said band, and a medium through which the band may be viewed, said medium having different portions of its area of different colors corresponding to the colors of the signs.

3. In a device of the class described, a pane of transparent material having a portion of one color and a portion of another color, the colors gradually blending at the adjacent ends of the said portions, a sign band movable past the pane and bearing different advertising matter in different colors corresponding to the colors of the said portions of the pane, and means for imparting motion to said band.

4. In a device of the class described, a display surface, means for imparting travel to said surface, the surface bearing in different colors and in non-registering relation, matters to be displayed, and means for displaying successive portions of said surface in the presence of different color media each capable of absorbing a respective one of said colors.

5. In a device of the class described, a display surface, means for imparting travel to said surface, the surface bearing in different colors and in non-registering relation, matters to be displayed, and means for simultaneously displaying successive portions of said surface in the presence of different color media each capable of absorbing a respective one of said colors.

6. In a device of the class described, a display surface bearing in different colors different matters to be displayed, the components of the two matters being arranged without regard to the arrangement of each other, means for imparting travel to the said surface, and means for independently displaying each of said matters by displaying said surface successively in the presence of color media each capable of absorbing a respective one of said colors.

In testimony whereof I affix my signature.

RICHARD MORGAN CRAIG. [L. S.]